UNITED STATES PATENT OFFICE.

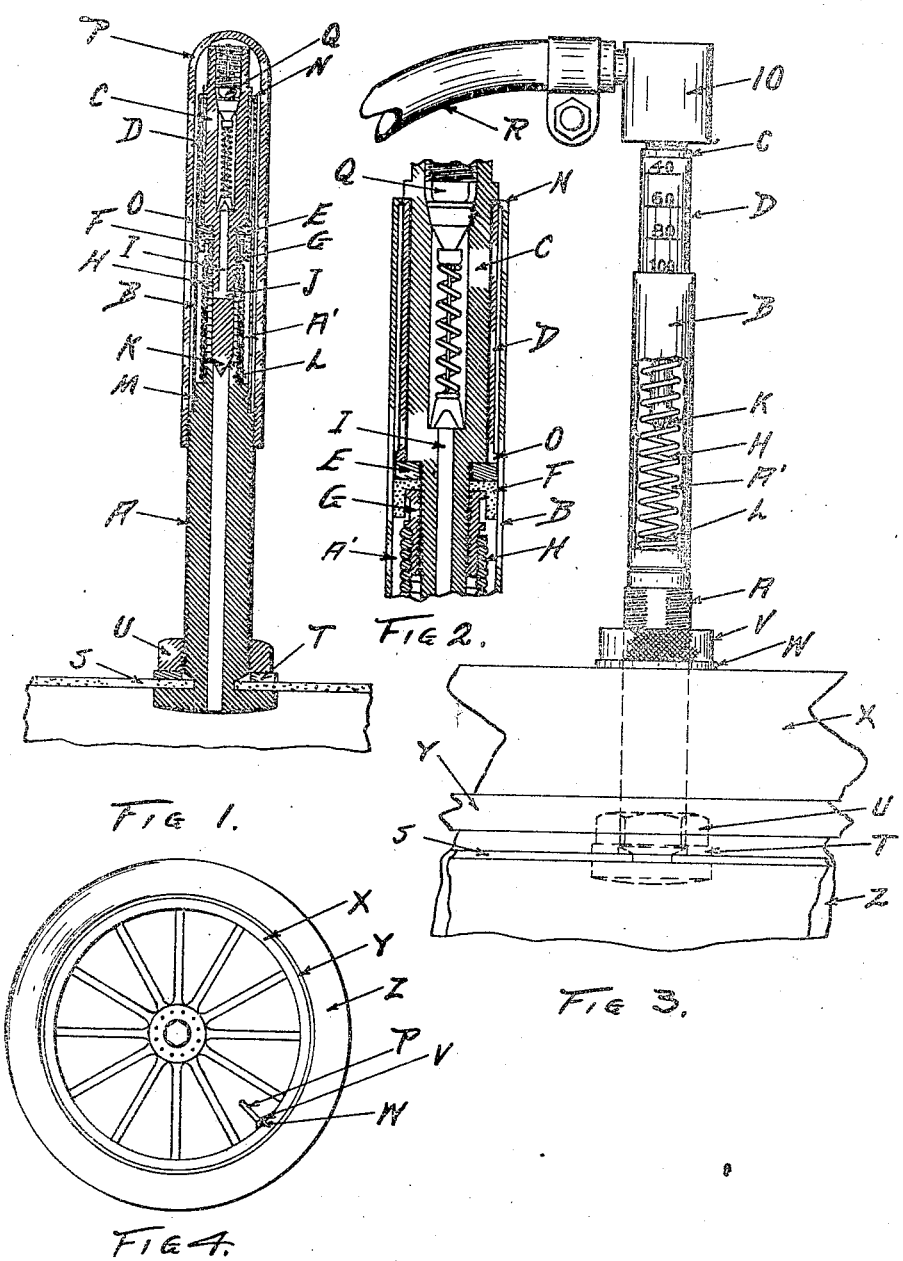

CHAUNCEY B. EARNHEART, OF INDIANAPOLIS, INDIANA, ASSIGNOR TO SAFETY FIRST DEVICES COMPANY, OF INDIANAPOLIS, INDIANA, A CORPORATION.

COMPRESSED-AIR VALVE AND GAGE.

1,305,261.

Specification of Letters Patent. Patented June 3, 1919.

Application filed May 8, 1916. Serial No. 96,119.

*To all whom it may concern:*

Be it known that I, CHAUNCEY B. EARNHEART, a citizen of the United States, and a resident of Indianapolis, county of Marion, and State of Indiana, have invented a certain new and useful Compressed-Air Valve and Gage; and I do hereby declare that the following is a full, clear, and exact description thereof, reference being had to the accompanying drawings, in which like letters refer to like parts.

The object of this invention is to improve the construction of air valves for pneumatic tires and the like, especially those having a pressure gage in permanent association with the valve mechanism.

One feature of the invention is the use of a valve stem with a reduced air passage therethrough, and it is extended by means of a tube crimped or otherwise secured on the outer end thereof, and an additional valve is provided for positively closing the passage through the valve stem, said additional valve structure being located in said added tube, and a tension spring surrounds the valve rod within said added tube for holding the valve closed against low pressure, but permitting it to yield under high pressure, whereby the valve structure does not need to have very much movement and, therefore, the enlarged outer end of said valve structure can have on it the graduations for indicating the air pressure in the tire. This enables large numerals and graduations to be employed inasmuch as they do not have to be placed on a reduced portion of the valve rod or structure. Furthermore, this structure dispenses with any sleeve, either in the valve stem or the valve rod, and employs only one piston-like member mounted about midway of the valve structure.

Another feature of the invention consists in combining with the valve stem a valve structure capable of positively closing the passage through the valve stem by means of a dust cap screwed down on the valve stem and at the same time forcing said valve into and holding it in its closed position.
The foregoing valve structure is in addition to the usual check valve found in air valves for pneumatic tires.

The full nature of the invention will be understood from the accompanying drawings and the following description and claims:

In the drawings, Figure 1 is a central longitudinal section through the device and a portion of the inner casing of the tire. Fig. 2 is a reproduction of a portion of what is shown in Fig. 1, but on a larger scale. Fig. 3 is a side elevation of the device, a portion of the tire and wheel, and a portion of the means for supplying air to the device, a part of the device being partially broken away to make the same plain and said device being shown in its actuated condition. Fig. 4 is a side elevation of a wheel equipped with said device.

The wheel has a wooden rim X, a metal clencher rim Y which may be demountable, an outer casing Z for the tire, and an inner tube S.

The valve stem A is secured to the inner tube of the tire by a head, a washer T, and a nut U, as shown in Fig. 1. It is secured to the rim of the wheel by a washer W and nut V. A dust cap P screws on the outer end of the valve stem.

The valve stem has a relatively reduced air passage of uniform size from end to end. Said passage is adapted to be closed at its outer end by a needle valve K which is at its outer end connected to a reduced valve rod integral with an enlarged outer portion C of the valve structure. This outer portion has an enlarged air passage through it containing the usual check valve Q. The air passage I continues through the valve rod for a portion of its length and then discharges laterally at J into a chamber surrounding the valve rod formed by the tube B which is open at its outer end where it loosely surrounds the outer end C of the valve structure and said tube at its inner end is crimped at M into an annular groove in the valve stem. That closes the inner end of the chamber A' and the outer end of said chamber is made air tight by a nut E and leather cup F secured on the reduced portion of the valve rod next to the enlarged portion C. The parts E and F are in the nature of packing and also in the nature of a piston so that the air entering the chamber A' under pressure will force said piston outwardly and thus open the valve K and permit the air to enter the tire. A tension spring H surrounds the valve rod and at its inner end is secured to a reduced portion L of the valve stem and at its outer end is secured to a nut G which clamps the cup F against the nut E. This spring is only strong enough to hold the valve closed against low pressure, but high pressure will force the valve structure outwardly in spite of said spring. When the pressure is reduced, the spring will close the valve.

The enlarged portion C of the valve structure has a loose sleeve D thereon which is graduated, as shown in Fig. 3, to indicate the air pressure as the valve structure is forced outward, as shown in said Fig. 3, by the back pressure of the air. The inner end of the sleeve D has an outward flange O adapted to engage a corresponding inward flange N on the outer end of the casing B in order to limit the movement and prevent the escape of the parts.

The operation is as follows:

When it is desired to charge a tire, the dust cap P is removed. If the pressure in the tire is weak, the valve K will remain closed under the influence of the spring H. If it is rather strong, it may force the valve K outwardly somewhat. An air tube R from some suitable supply of compressed air is connected with said device by a nozzle 10 being secured to the outer end of the valve member C. As air under pressure enters the chamber A', it will force the valve K open by its expansion acting against the piston E F and thus enabling the air to enter the passage through the valve stem. As the tire becomes charged, the pressure will force the valve structure farther and farther outward, as shown in Fig. 3, so as to uncover the graduations or indications and thus the air pressure will be indicated. When the desired air pressure is attained, the air is turned off and the dust cap is replaced and screwed down on the stem until it forces the valve K into tight closing position and it maintains said valve piston closed. The tube D is made so as to turn and thus enable a plurality of vertical rows of graduation numerals and marks to be placed thereon so that finer graduations and more accurate numerical indications may be employed than if only one row be provided, as would be the case if the numerals were on the reduced part of the valve rod.

The invention claimed is:

1. The combination of an air valve stem, with an air passage therethrough, a movable valve structure for closing the outer end of said air passage, said valve structure having an air opening with a terminal between its ends, a piston carried by said valve structure and positioned above said terminal for causing said valve structure to open when air is entered in the passage way between the passage closing end and the piston, and a dust cap adapted to screw on said valve stem and engage and positively hold said valve in closed position.

2. The combination of an air valve stem, with an air passage therethrough, a valve for opening and closing the passage over the valve stem, a piston in said valve, arranged so that when air is introduced into the passage between the passage closing end of the valve and the piston, the valve will be opened, a spring for closing said valve against low air pressure, but which yields against high pressure, and a dust cap adapted to screw on said stem and hold the valve in closed position.

3. The combination of an air valve stem having an air passage longitudinally therethrough, a valve structure in alinement with said valve stem, a casing secured to said valve stem and surrounding said valve structure and forming a chamber therein wherein the air under pressure will tend to expand and open said valve, and a tension spring surrounding said valve and connected with it at one end and with the valve stem at the other end adapted to hold the valve closed against low pressure but permit it to open under the influence of high pressure.

4. The combination of an air valve stem having an air passage of uniform dimensions throughout, a tube secured to the outer end of the valve stem and forming an extension thereof, a valve structure consisting of an outer enlarged portion and an inner reduced portion with a tapering valve on the end thereof for closing the outer end of the air passage through the valve stem, said valve structure having an air passage in the outer portion thereof through which air under pressure enters the chamber within said tube and surrounding the reduced part of the valve structure, and a tension spring secured at its inner end to the valve stem and at its outer end to the reduced portion of the valve structure near the enlarged portion thereof.

5. The combination of an air valve stem having an air passage of uniform dimensions throughout, a tube secured to the outer end of the valve stem and forming an extension thereof, a valve structure consisting of an outer enlarged portion and an inner reduced portion with a tapering valve on the end thereof for closing the outer end of the air passage through the valve stem, said valve structure having an air passage in the outer portion thereof through which air under pressure enters the chamber within said tube and surrounding the reduced part of the valve structure, a piston secured to the reduced portion of the valve structure, and a tension spring secured at one end to said piston and at its other end to the valve stem.

6. The combination of an air valve stem having an air passage extending therethrough, a valve structure with its outer portion enlarged and the inner end reduced and adapted to close the outer end of the air passage through said valve stem, yielding means for holding said valve structure closed against low pressure but permitting it to open from high pressure, a piston on said valve structure for causing the valve structure to ascend when air is entered through the same between its passage closing end and the piston, and a sleeve loosely mounted on said valve structure so as to turn and provided with suitable graduations for indicating the air pressure in the tire.

7. The combination of an air valve stem having an air passage of uniform dimensions throughout, a tube secured to the outer end of the valve stem and forming an extension thereof, a valve structure consisting of an outer enlarged portion and an inner reduced portion with a tapering valve on the end thereof for closing the outer end of the air passage through the valve stem, said valve structure having an air passage in the outer portion thereof through which air under pressure enters the chamber within said tube and surrounding the reduced part of the valve structure, a piston secured to the reduced portion of the valve structure, a tension spring secured at one end to said piston and at its other end to the valve stem, and means for limiting the outward movement of said valve structure so that it cannot escape from said tube.

8. The combination of an air valve stem having an air passage therethrough, a tube secured to the outer end of the valve stem and forming an extension thereof, a valve structure movable in said tube for opening and closing the air passage through the valve stem, said valve structure having an air passage through the outer portion thereof and discharging laterally into the chamber in said tube surrounding the inner part of the valve structure, a check valve in the outer portion of said valve structure, a tension spring surrounding the inner portion of said valve structure for closing it against low pressure and permitting it to open against high pressure, and a dust cap adapted to screw on the valve stem and engage the outer end of the valve structure and hold the valve positively in closed position.

In witness whereof, I have hereunto affixed my signature.

CHAUNCEY B. EARNHEART.